United States Patent [19]
Baldus et al.

[11] Patent Number: 6,088,768
[45] Date of Patent: Jul. 11, 2000

[54] METHOD AND SYSTEM FOR MAINTAINING CACHE COHERENCE IN A MULTIPROCESSOR-MULTICACHE ENVIRONMENT HAVING UNORDERED COMMUNICATION

[75] Inventors: Donald Francis Baldus, Mazeppa; Nancy Joan Duffield, Rochester; Russell Dean Hoover, Rochester; John Christopher Willis, Rochester; Frederick Jacob Ziegler, Rochester, all of Minn.

[73] Assignee: International Business Machines Corporation, Armonk, N.Y.

[21] Appl. No.: 08/174,648

[22] Filed: Dec. 28, 1993

[51] Int. Cl.[7] .............................. G06F 12/00; G06F 13/00
[52] U.S. Cl. .......................... 711/141; 711/118; 711/119; 711/130
[58] Field of Search ..................... 395/471, 472, 395/474, 477, 479, 446; 711/3, 117, 118, 119, 130, 141, 154, 147

[56] References Cited

U.S. PATENT DOCUMENTS

| | | | |
|---|---|---|---|
| 4,426,681 | 1/1984 | Bacot et al. | 395/457 |
| 4,930,122 | 5/1990 | Takahashi et al. | 370/85.15 |
| 4,969,146 | 11/1990 | Twitty et al. | 370/85.1 |
| 5,084,877 | 1/1992 | Netravali et al. | 371/32 |
| 5,101,402 | 3/1992 | Chiu et al. | 370/17 |
| 5,115,431 | 5/1992 | Williams et al. | 370/94.1 |
| 5,167,035 | 11/1992 | Mann et al. | 395/182.02 |
| 5,274,787 | 12/1993 | Hirano et al. | 395/470 |
| 5,297,269 | 3/1994 | Donaldson et al. | 395/472 |
| 5,404,482 | 4/1995 | Stamm et al. | 395/435 |
| 5,404,483 | 4/1995 | Stamm et al. | 395/471 |

*Primary Examiner*—Tuan V. Thai
*Attorney, Agent, or Firm*—Felsman, Bradley, Vaden, Gunter & Dillon, LLP

[57] ABSTRACT

A method and system for providing cache coherence despite unordered interconnect transport. In a computer system of multiple memory devices or memory units having shared memory and an interconnect characterized by unordered transport, the method comprises sending a request packet over the interconnect from a first memory device to a second memory device requiring that an action be carried out on shared memory held by the second memory device. If the second memory device determines that the shared memory is in a transient state, the second memory device returns the request packet to the first memory device; otherwise, the request is carried out by the second memory device. The first memory device will continue to resend the request packet each time that the request packet is returned.

15 Claims, 4 Drawing Sheets

METHOD AND SYSTEM FOR MAINTAINING CACHE COHERENCE IN A MULTIPROCESSOR-MULTICACHE ENVIRONMENT HAVING UNORDERED COMMUNICATION

BACKGROUND OF THE INVENTION

1. Technical Field

The present invention relates in general to a method of maintaining cache coherence and in particular to a method of maintaining cache coherence in a computer system having unordered communication. Still more particularly, the present invention relates to a method of maintaining cache coherence in a multiprocessor system having unordered communication.

2. Description of the Related Art

A wide variety of different interconnect structures are used to couple processors, memory, and input/output (I/O) in modern computer systems. For example, these interconnects include buses, switches and interlocking rings. Ordered transport describes an interconnect's ability to deliver encapsulated information units, such as messages, packets, or bus cycles, in the same order in which they are enqueued or programmed between a distinct sender unit on the interconnect and a distinct receiver unit on the interconnect. For example, if an interconnect maintains ordered transport, transmission of packet A followed by packet B from the same memory device leads to receipt of packet A prior to receipt of packet B at the destination. If an interconnect does not insure ordered transport, packet B may either be received before or after packet A. For example, an interconnect may provide multiple pathways between the same source and destination. If more than one pathway is active at the same time and equivalent pathways have different transmission latencies, the delivery order may differ from transmission order. If an ordered transport methodology is not imposed on the interconnect, the interconnect may often be designed in a way which reduces latency, increases bandwidth and increases reliability.

While an interconnect characterized by such unordered transport may have lower latency, increased bandwidth, or increased reliability, potential for reordered transport greatly complicates the support hardware and software for coherent shared memory across the interconnect. The problem becomes particularly complicated when cache memory is utilized in a multiprocessor system. Caches in multiprocessors must operate in concert with each other. Specifically, any data that can be updated simultaneously by two or more processors must be treated in a special way so that its value can be updated successfully regardless of the instantaneous location of the most recent version of the datum. This is normally accomplished by assigning ownership of the datum to the memory device (cache or shared memory) which currently holds its present value and only allowing the present owner of the datum to change its value.

The problem of noncoherence in shared memory resulting from unordered transport can arise in various ways. For example, a memory device or memory unit may receive a request directing that a memory coherence operation such as purge or invalidate be performed on a specific interval or block of memory. The state of this block, as known to the memory device or memory, may be unknown as a result of other information packets traveling through the interconnect or awaiting service in another memory device or memory. Response to such request while the memory block is in an unknown state can lead to violations of the computer's consistent shared memory architecture.

As a more particular example, a memory control unit may direct that a cache return ownership of a memory block to the memory control unit. The cache notes that it has a store-thru operation outstanding for this block. The cache does not know if the store has updated the data value recorded by the memory controller because it has not yet received a confirmation. Thus, the state of the memory block is unknown to the cache on receipt of the memory control unit's purge request. If the cache were to return ownership, and the return packet overtakes the store-thru packet within the interconnect because of the unordered transport, the memory control unit may reissue ownership of the memory block to another cache along with an outdated value of memory.

The problem of noncoherence created by the potential of unordered interconnect transport is commonly corrected in one of three ways. First, the system architecture may require that the interconnect provide ordered transport. This solution is inefficient due to the decreased bandwidth and higher latency introduced. Second, sequence numbers may be assigned to packets transported through the interconnect which allow the unordered packets to be reassembled in order at the end points of their transports. Such a scheme requires substantial buffering of the packets at the end points, thereby increasing costs and complicating the design. Third, ownership may be retained at the memory control unit to prevent stale copies from being retained by a cache, or a memory device from reading a noncurrent value in shared memory. The problem with this scheme is that it severely reduces performance by virtually eliminating the advantages of cache memory systems.

The present invention provides a unique solution to the problem of noncoherence caused by unordered interconnect transport. This solution eliminates requirements for transport order on the interconnect, thus, retaining the advantages of unordered transport. It eliminates the need for buffering of packets at end points on the interconnect, thus, reducing cost. And it eliminates the need for fixed memory control ownership of memory blocks, thus, retaining the performance advantages of read/write caching. Moreover, the present invention achieves this at little additional cost or complexity.

SUMMARY OF THE INVENTION

According to the present invention, a method and system provides for cache coherence despite unordered interconnect transport. In a computer system of multiple memory devices or memory units having shared memory and an interconnect characterized by unordered transport, the method comprises sending a request packet over the interconnect from a first memory device to a second memory device requiring that an action be carried out on shared memory held by the second memory device. If the second memory device determines that the shared memory is in a transient state, the second memory device returns the request packet to the first memory device; otherwise, the request is carried out by the second memory device. The first memory device will continue to resend the request packet each time that the request packet is returned.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The interconnect of parallel or multi-processor systems embodying this invention provides concurrent and unordered transport of communications among caching agents and shared memory. A concurrent interconnect may have more than one communication in transit at any one time. An interconnect with unordered transport may deliver communications between two end points in an order different than they were transmitted. Parallel or multi-processor systems with concurrent and unordered transport are well known and have been used extensively in computer architecture. As one example, the interconnect may be formed by two buses such that all caching agents and all memories are attached to both buses. If the buses are arbitrated and driven independently, the multiple bus interconnect is capable of concurrent transport. If communications are arbitrarily routed along one or the other bus, unordered transport is possible. As a second example, the interconnect may be comprised of multiple stage switching elements with multiple active pathways between end-points. A particular example of this type of interconnect would be a "hypercube".

The interconnect structure transports messages in the form of packets of information. Select packet pairs form a transaction. Transactions implement the reliable transmission of information using a request packet which initiates an operation involving a memory interval of shared memory, and a response packet acknowledging or confirming the operation. Those who initiate operations are known as requesters or initiators. A hardware unit which responds to operations initiated by requester is known as a responder. A given unit such as a processor, cache, Shared memory or I/O device may function as both a requester and a responder for different transactions. Request packets transmit a message from requester to responder. The responder replies with a response packet which completes the transaction. This communication transaction is known as a "split transaction". A split transaction is one involving two transfers between agents, but where additional unrelated transfers are permitted to occur between the two transfers of the split transaction. As an example, a cache will make the first transfer by sending a message out over an interconnect stating that it is initiating an internal invalidation or purge. The second transfer of the split transaction would be an incoming packet from the other caches and/or shared memory acknowledging the invalidation or purge message. This incoming communication usually completes the transaction, allowing the cache to remove any record it has of both the cached copy and the transaction.

Figure 1:
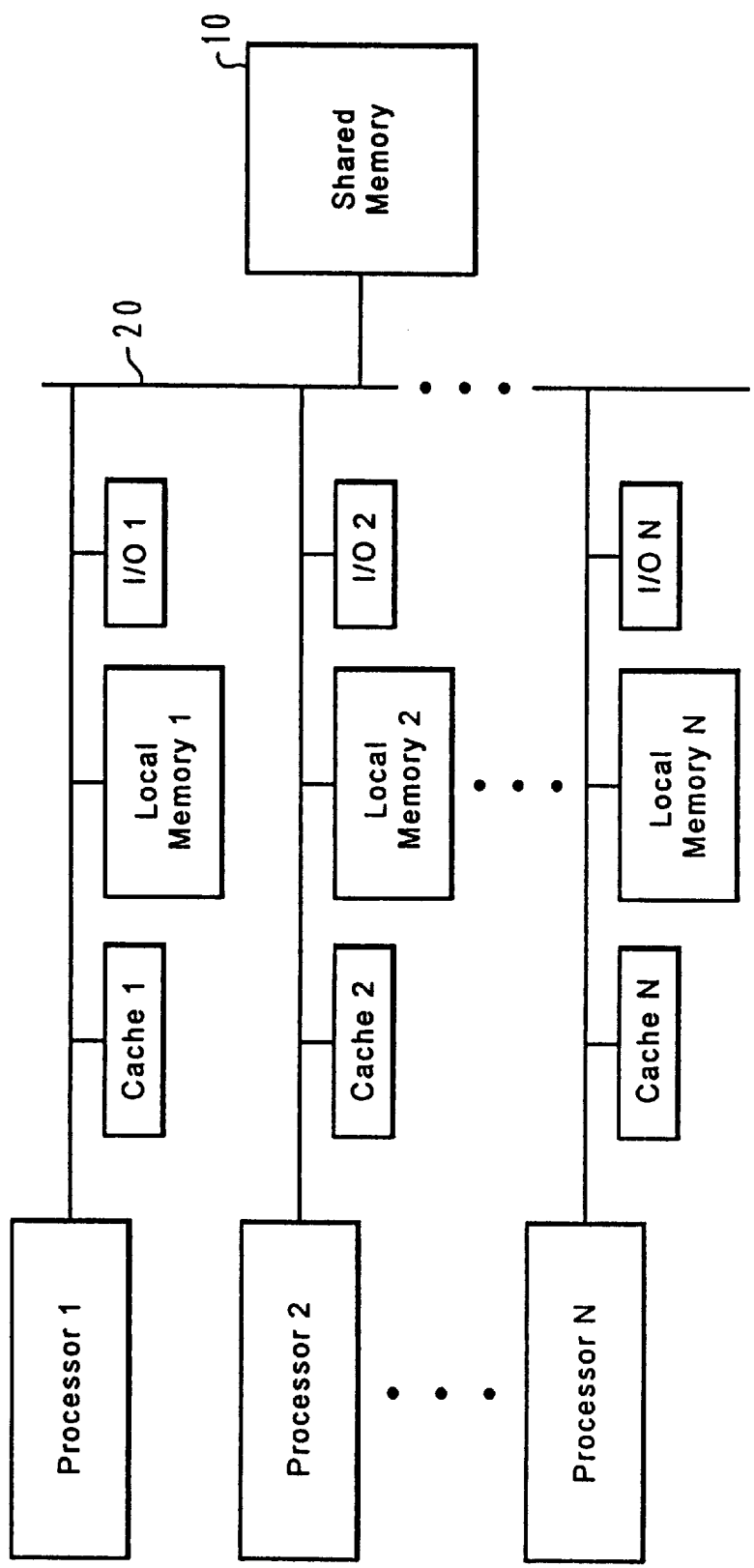
FIG. 1 depicts a multiprocessor computer system used with a preferred embodiment of the present invention.

With reference now to the figures and in particular with reference to FIG. 1, there is shown a pictorial representation of a parallel processor or multiprocessor computer system which may be utilized to implement the method and system of the present invention. Such a computer system would contain at least one shared memory 10, at least two caching agents capable of maintaining cached copies from the shared memory, and an interconnect structure 20 between the memory and the cached agents that provides concurrent and unordered transport of communications. The caching agent maintaining the cached copies from the shared memory is typically either a processor with integral cache or an input/output (I/O) device with integral cache. Here, each processor is shown having its own cache, local memory and I/O unit, all connected to a common node.

The processor or I/O device usually obtains the cache copy as a result of a reference by the processor or I/O device to a memory location assigned to the shared memory in shared memory 10. A reference to a shared memory location typically occurs when a processor or I/O device reads an instruction or data value, or when a write is made to a data value in the shared memory location. Thus, this reference results in the copying of one or more memory locations, commonly called the memory interval, into a private cache memory, local to the processor or I/O device. For example, processor 1 may wish to write a new data value to a shared memory interval in shared memory 10. Processor 1 sends a request message or packet requesting the write, over the interconnect structure 20 to shared memory 10. Shared memory 10 responds by sending a response packet approving the write over interconnect structure 20 to cache 1. Processor 1 writes a new data value to the copy of the shared memory interval in cache 1, and then transports the data value in a packet over interconnect 20 to shared memory 10.

Because copies of a shared memory variable may be held by multiple caches in the system, cache coherence must be maintained when writing to the variable. If processor 1 alters the data value of a shared memory interval in shared memory 10 that is also held in one or more private cache memory locations such as cache 2–cache n, the memory interval copies retained in cache 2–cache n must be kept coherent with the alteration. The cache private memory cache 1 will be kept coherent with the shared memory in shared memory 10 by performing a cache coherency operation such as updating, invalidating or purging the other cache private copies held by cache 2–cache n. Typically, the copy held by the caching agent initiating the update, cache 1, is updated while copies present in other caches, cache 2–cache n, are externally purged if they have the latest copy of the memory interval or they are invalidated if the latest copy of the memory interval is already held by shared memory 10. A purge function is where a writeback of the copy to shared memory is generated and then the copy is invalidated. The purge or invalidate command arrives at caches 2–n via the interconnect 20 from either the caching agent initiating the write, processor 1, or from the shared memory 10.

Alternative to external purging or invalidation, a processor may internally initiate an invalidation or purge of a copy of a shared memory interval maintained in its local cache memory. For example, such an invalidation or purge may be initiated in order to provide the private cache memory space needed to acquire a copy of another memory location referenced by the processor. In the case of internally triggered invalidation or purging by processor 1 while shared memory 10 or caches 2–n maintain a record of the cached copy, cache 1 will initiate a communication transaction notifying caches 2–n or shared memory 10 that a copy of the shared memory interval is no longer being maintained by cache 1 by sending a communication packet over interconnect 20. The caches or shared memory respond by sending an acknowledgment packet back to cache 1.

In this way, a memory interval, or block, has at most one owner at any one time who may alter the data value of that block. The owner defines the unique location in the system at which the latest value of the block resides. Store or write commands must occur at the owner to ensure altering the latest version of a block's value and/or state. Fetches and cleared reservations may utilize one of several copies as long as the owner ensures that the copies are invalidated before updating the value associated with the block. No operations may be performed on the memory interval by any processor while the ownership of the memory interval is in transit on the interconnect. Any such operations must be delayed until there is an observable owner.

It is during operations such as those in the above examples that the problem solved by the present invention arises. Because the communication transaction is a split transaction and the interconnect is characterized by unordered transport, the incoming packet may be an unrelated request, perhaps requesting an update, invalidate or purge initiated by another cache or by shared memory 10, and not the second transfer of the split transaction. When cache 1 receives such a request packet, cache 1 must respond without knowing which other caches or the shared memory are aware of the split transaction cache 1 still has outstanding. Furthermore, Cache 1, is unable to refuse incoming communications for it must receive the packet which concludes the split transaction.

In accordance with the present invention, if the incoming packet requests changes in the state of the cached copy of a shared memory interval that is the subject of an outstanding transaction, the cache's state machine responds by "bouncing" the request packet back to the requester as explained below.

In conventional computer systems, shared memory and caching agents each contain control logic that changes the state of memory intervals associated with that unit. These state machines, which respond to incoming request packets arriving during the temporal window of the split transaction, control memory blocks and pass communications in order to maintain cache coherence of shared memory within the system. The present invention adds additional states to the control logic associated with both the caching agent state machine and the shared memory state machine. These state machines may be implemented using many different connections between logic gates. The reduction from state machine diagrams to physical embodiments is well known to those skilled in the art of computer hardware design.

The simplest state machine within a shared memory system will hold any particular memory interval in one of three stable functional states: empty, shared, and exclusive. A more complex state machine, such as those associated with a shared memory, will have multiple stable functional states depending on where the ownership of the interval is held. The state machine makes transitions from these stable functional states by performing operations which are defined as "transient" states. The transient states—purging, fetching, and shifting—persist for a single transaction until the memory interval shifts to another stable functional state.

Figure 2:
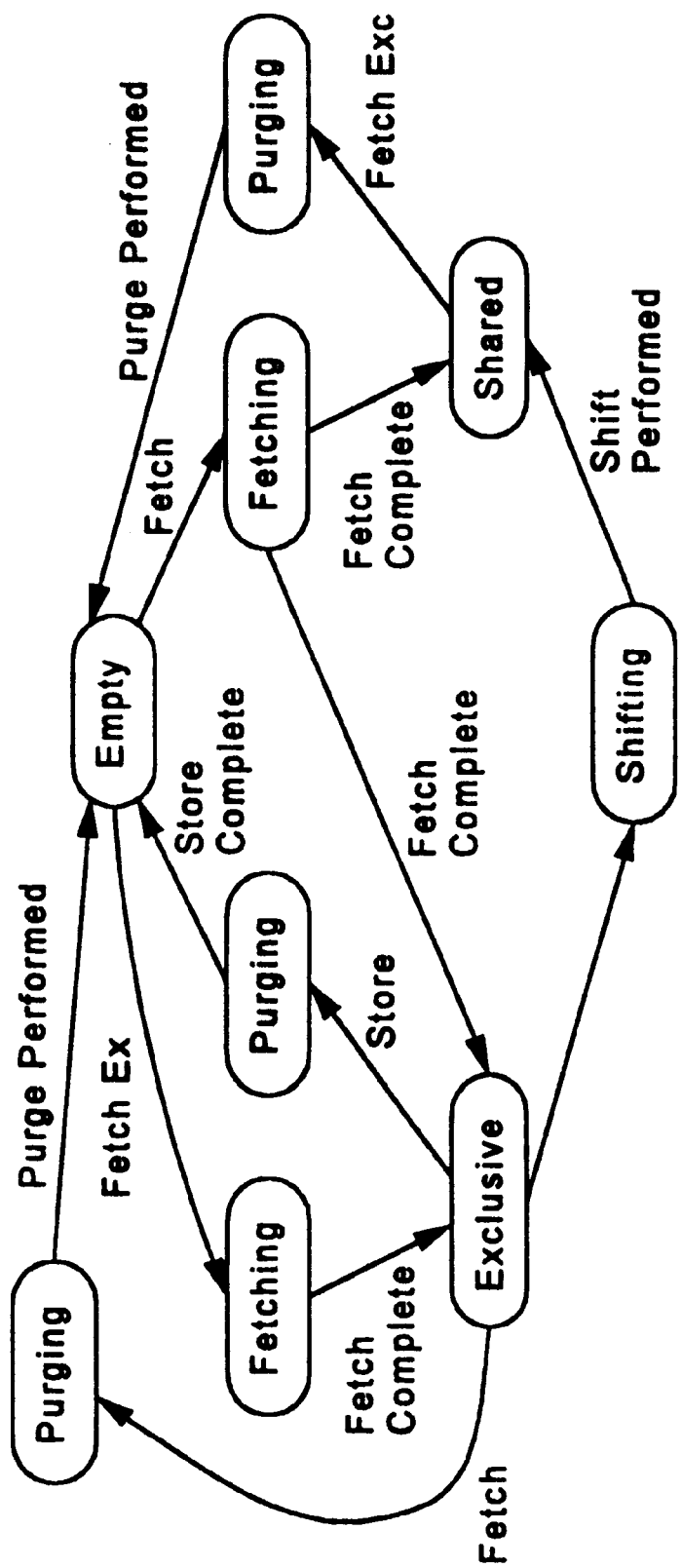
FIG. 2 shows a state transition diagram of a cache coherency state machine for a memory interval contained in a cache as used in a preferred embodiment of the present invention.

FIG. 2 shows the relationship between functional and transient states in a state transition diagram of a cache coherency state machine for a shared memory interval contained in a caching agent. At any one instant in time, a memory interval will have an associated state. The stable functional state of "empty" shows that the memory interval has not been mapped to any cache. The "shared" state shows that one or more caches have a copy of the memory interval, but that shared memory 10 is the interval's owner. The "exclusive" state is where a caching agent has an exclusive copy of the memory interval, and that cache retains exclusive ownership such that no other cache or shared memory may write to that interval. The transient state "purging" indicates that a purge request is still outstanding. The "shifting" state indicates that a request is outstanding to shift the memory interval to a shared state. The "fetching" state indicates that the cache has an outstanding fetch request for the memory interval.

Figure 3:
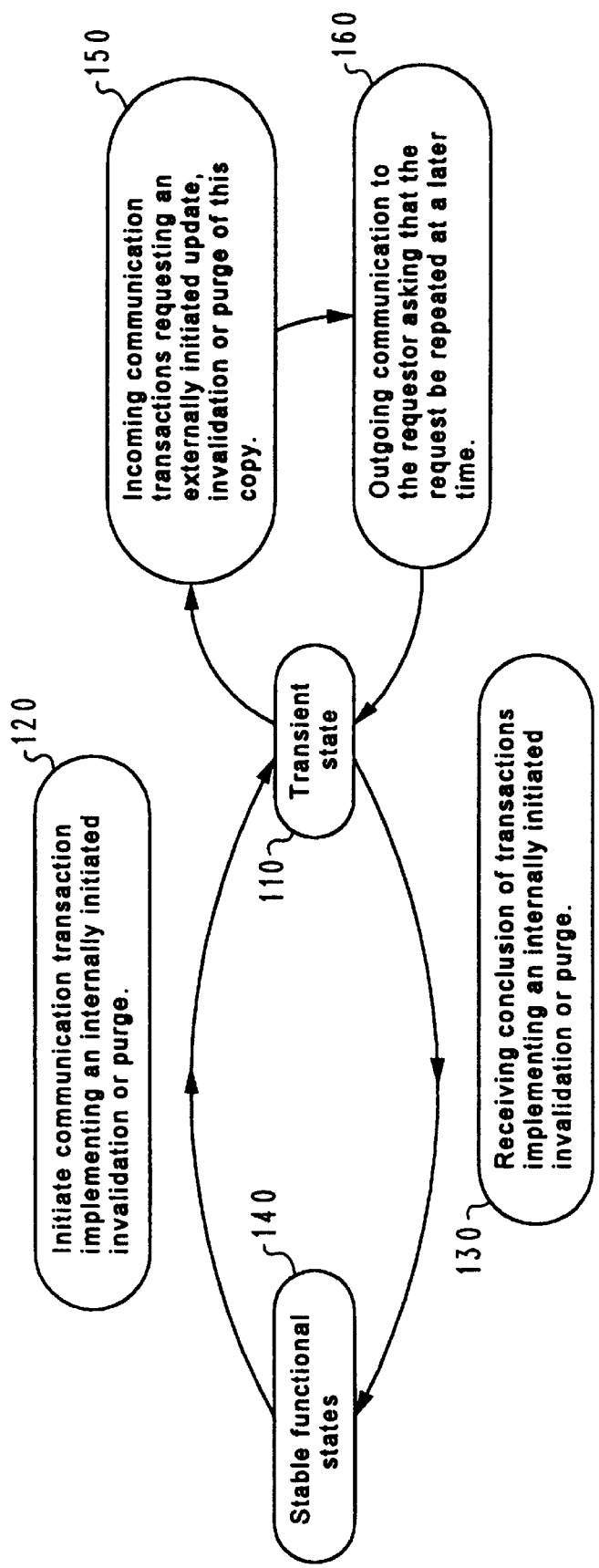
FIG. 3 shows the functional operation of a caching agent state machine associated with a specific copy of a shared memory interval in accordance with a preferred embodiment of the present invention.

FIG. 3 illustrates the additional state and state transitions added to the state machine embedded in each caching agent of the computer system in accordance with a preferred embodiment of the present invention. It should be noted that FIG. 3 depicts the transactions that would be seen in the internally initiated purge example. It will be appreciated that the transitions are generic to any operation that may be performed on the shared memory interval. Conceptually each memory interval in the private cache memory of a caching agent has such additional states in a state machine. Practical implementations will usually reuse the same logical gates for the state transitions of all memory intervals in the same caching agents.

Returning to the example above, when the caching agent initiates the invalidation or purge of a copy held in the private cache buffer, the state machine associated with the copy sends a communication in the form of a transmission packet to other caching agents with copies of the same shared memory block, and possibly to shared memory 10 (depending on the particular coherence algorithm chosen). When the communication packet enters interconnect structure 20 from this caching agent, in this example cache 1, the state machine associated with the memory interval enters the transient state 110. The memory interval may enter this transient state at any time a caching agent or shared memory 10 has an outstanding transaction on the interconnect involving an operation or action that changes the state of the memory interval. In our example, cache 1 has initiated an invalidation or purge of a copy held in its private cache buffer at position 120. Usually the next communication received from the interconnect at position 130 concludes the invalidate or purge transaction, returning the state machine to the conventional states at position 140. Position 140 represents the stable functional states of empty, shared, and exclusive shown in FIG. 2.

Less frequently, it is possible for an incoming communication transaction initiated by another caching agent or a shared memory, as seen at position 150, to request an update, invalidation or purge of the memory interval currently in a transient state. The state machine of the present invention responds with a communication, as seen at position 160, asking that the requester repeat the request at a later time. The state machine then returns to the transient state 110 so as to permit the acceptance of additional incoming messages. Thus, the present invention allows a cache to maintain coherence by returning, or "bouncing", a request packet referencing a memory interval in a transient state back to the requestor. By bouncing request packets, the caching agent will not perform operations on the transitory memory interval that may create noncoherence in the shared memory. The caching agent state machine continues to bounce request packets and as long as the memory interval is in a transient state. With this scheme, interconnect operation remains stable despite finite or even an absence of buffering internal to the interconnect.

As another example of the present invention, shared memory 10 may require that a memory interval held exclusively by cache 1 be shifted to a shared memory interval. Shared memory 10 would send a request packet to cache 1 requesting a shift of the memory interval from an exclusive state to a shared state. If ownership of the memory interval is in transit, or, in other words, the interval is the subject of an outstanding split transaction when the shift-to-shared packet arrives, cache 1 will bounce the request. Shared memory 10 will respond by resending the request packet to cache 1. On receipt of the resent shift-to-shared packet, cache 1 may carry out the request if ownership of the memory interval has been settled in the time elapsed, or it may again bounce the request packet.

Figure 4:
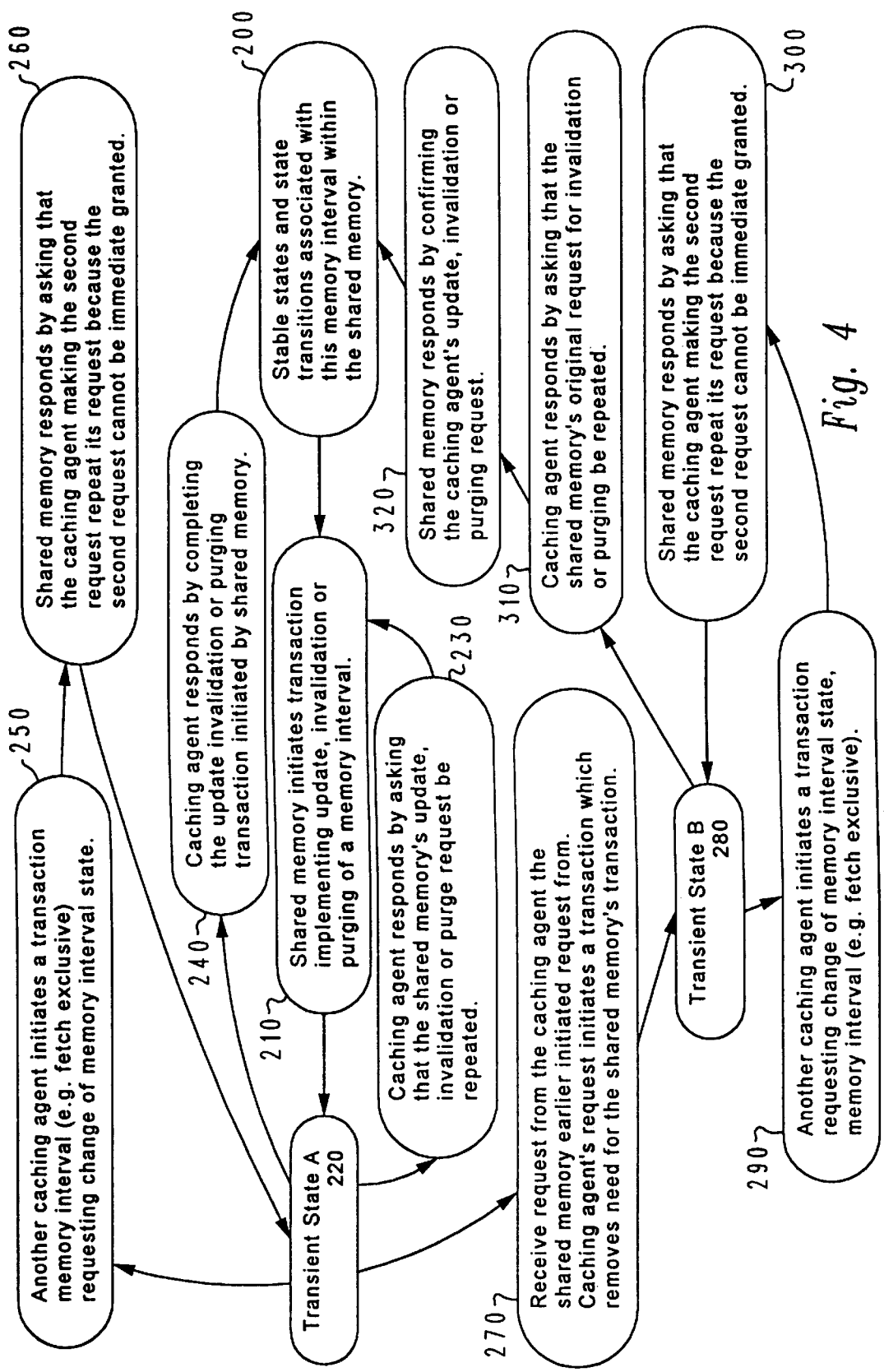
FIG. 4 illustrates the transitions between states in a shared memory state machine associated with a specific shared memory interval in accordance with a preferred embodiment of the present invention.

FIG. 4 illustrates the states and transitions from states in the shared memory state machine associated with a specific shared memory interval in accordance with a preferred embodiment of the present invention. Once again, conceptually there is one such state machine for every memory interval sharable within the shared memory of shared memory 10.

The stable states conventionally embodied in shared memory state machine controllers is represented by the stable functional states 200. When an incoming request or internal operation (perhaps machine shut-down) results in the shared memory initiating a communication transaction to a caching agent holding a copy of the memory interval (for example cache 1), as seen at position 210, where the transaction implements an action such as an update, invalidation or purge of a shared memory interval, the shared memory state machine associated with that memory interval enters a transient state 220. While in transient state 220, the shared memory controller continues to respond to incoming communications. If the incoming communications routed to the shared memory state machine request a repeat of the request packet initiating the current outstanding transaction (i.e. the request is bounced), as seen at position 230, the state machine retransmits the request packet over the interconnect structure at position 210, and the state machine returns to transient state 220, ready to respond to the next incoming communication.

Importantly, the state machine may retransmit the request packet only after ensuring that the conditions requiring the operation are still valid.

Usually the next communication received from the interconnect, at position 240, concludes the split transaction currently outstanding, returning the state machine to the conventional states at position 200. Potentially, shared memory 10, may receive an incoming communication transaction initiated at position 250, by another caching agent (for example cache 2) asking that an action be performed on the same shared memory interval that is the subject of the split transaction initiated at position 210. The state machine of the present invention contained in shared memory 10 responds with the communication, as seen at position 260, asking that the caching agent repeat the request at a later time. In other words, the request is bounced. The state machine then returns to the transient state 220 so as to permit the acceptance of additional messages.

In the same instance, the shared memory state machine may receive an incoming communication from the caching agent receiving the request packet of the current outstanding transaction (cache 1) in which the caching agent (cache 1) initiates invalidation or purging of the memory interval on its own, as shown at position 270. Rather than bouncing the request packet back to cache 1, the shared memory state machine responds by entering transient state 280. Because the current split transaction is still outstanding, it is still possible for the shared memory to receive another incoming communication transaction, at position 290, initiated by another caching agent (such as cache 2) requesting that an action be performed such as an update, invalidation or purge of the memory interval currently in transient state 280. The state machine of the present invention responds by bouncing this request, as seen at position 300. If the response packet to the outstanding transaction of update, invalidation or purge originally initiated by the shared memory arrives, as seen at position 310, either as a request for repetition of the request packet or as a conclusion to the outstanding transaction, the shared memory state machine sends a response packet to the caching agent confirming the action initiated by the agent, at position 320, and then returns to the stable functional states 200.

In summary, the present invention handles the infrequent case of overlapping and conflicting requests from a caching agent and shared memory by "bouncing" the request if the state machine receiving the request has a transaction outstanding that involves the shared memory interval referenced by the request.

While the invention has been particularly shown and described with reference to a preferred embodiment, it will be understood by those skilled in the art that various changes in form and detail may be made therein without departing from the spirit and scope of the invention.

What is claim is:

1. A method of maintaining coherent shared memory within a multiprocessor system including a plurality of memory devices sharing a shared memory interval, comprising the steps of:
   sending a first request packet from a requesting memory device directing a responding memory device having a copy of the shared memory interval to perform an action on the copy;
   returning the first request packet to the requesting memory device if the copy is in a transient state such that the copy is the subject of an outstanding transaction; and
   resending the request packet to the responding memory device, wherein the step of resending is performed only after ensuring that the conditions under which the original request was generated still dictate that the request should be performed.

2. A method of maintaining coherent shared memory within a multiprocessor system according to claim 1, wherein the requesting memory device is a cache associated with a first processor, and the responding memory device is a cache associated with a second processor.

3. A method of maintaining coherent shared memory within a multiprocessor system according to claim 1, wherein the responding memory device is a shared memory.

4. A method of maintaining coherent shared memory within a multiprocessor system according to claim 1, wherein the requesting memory device is a shared memory.

5. A method of maintaining coherent shared memory within a multiprocessor system according to claim 1, wherein the action is a memory coherence operation.

6. A method of maintaining coherent shared memory within a multiprocessor system according to claim 5, wherein the memory coherence operation is a purge operation.

7. A method of maintaining coherent shared memory within a multiprocessor system according to claim 1, wherein the request packet requests exclusive ownership of the shared memory interval.

8. A method of maintaining coherent shared memory within a multiprocessor system according to claim 1, further comprising the step of performing the action if the copy is not in a transient state.

9. A data processing system, comprising:

a first memory device containing a shared memory block, wherein the first memory device returns to sender a received request packet that requests an operation involving a memory block in a transient state; and a second memory device in communication with the first memory device that sends a request packet directing the first memory device to perform an operation on the shared memory block, if the request packet is returned indicating the shared memory block is in a transient state, the second memory device resends the request packet to the first memory device, wherein the second device resends the request packet only if the conditions requiring the operation are still valid.

10. A data processing system according to claim 9, wherein the first device is a caching agent.

11. A data processing system according to claim 9, wherein the second memory device is a caching agent.

12. A data processing system according to claim 9, wherein the first device is a shared memory.

13. A data processing system according to claim 9, wherein the second device is a cache control unit.

14. A data processing system according to claim 9, wherein the second device is a shared memory.

15. A data processing system according to claim 9, wherein the operation is a cache coherency operation.

* * * * *